Sept. 11, 1962 — J. J. HOPKINS — 3,053,928
DEFERRED ACTION BATTERY
Filed Aug. 17, 1948 — 3 Sheets-Sheet 1

INVENTOR.
JOHN J. HOPKINS
BY
ATTORNEY

Sept. 11, 1962  J. J. HOPKINS  3,053,928
DEFERRED ACTION BATTERY
Filed Aug. 17, 1948  3 Sheets-Sheet 2

INVENTOR.
JOHN J. HOPKINS
BY
ATTORNEY

Sept. 11, 1962 J. J. HOPKINS 3,053,928
DEFERRED ACTION BATTERY
Filed Aug. 17, 1948 3 Sheets-Sheet 3

INVENTOR.
JOHN J. HOPKINS
BY
ATTORNEY

United States Patent Office 3,053,928
Patented Sept. 11, 1962

3,053,928
DEFERRED ACTION BATTERY
John J. Hopkins, Silver Spring, Md., assignor to the United States of America as represented by the Secretary of the Navy
Filed Aug. 17, 1948, Ser. No. 44,696
6 Claims. (Cl. 136—90)

The present invention relates to a deferred action battery. More specifically, it relates to a battery that may be stored indefinitely without chemical deterioration, but which may be put into service almost instantaneously by releasing the electrodes and causing them to be inserted into the electrolyte, all without reliance on gravitational, inertial and/or centrifugal forces for such activation of the battery.

In one type of deferred action battery heretofore provided for use in proximity fuzes, the electrodes were arcuate plates, arranged circumferentially around a frangible vessel containing the electrolyte, which was arranged to be broken, usually by inertial forces, when activation of the battery was to take place. The electrolyte, thus freed, was caused to flow radially outward by centrifugal force, due to the spinning of the missile carrying the fuze. While such batteries are highly satisfactory for their intended purpose, in spinning missiles, they obviously would not operate in other types of missiles that were devoid of spin, such as bombs, and certain mortar shells, for example.

It is an object of the present invention to provide a battery which may be stored without deterioration for long periods, but activated quickly when needed, by mechanism that does not require either centrifugal force or high acceleration forces, thus adapting the battery to many uses for which the former type of deferred action battery was unsuitable.

Another object is to provide a deferred action battery which may be activated practically instantaneously upon release of the electrode assembly embodied therein.

A further object is to provide a deferred action battery wherein electrical leakage between cells, and the resulting electrical noise, will be reduced greatly.

Other objects and many of the attendant advantages of this invention will be appreciated readily as the same becomes understood by reference to the following detailed description, when considered in connection with the accompanying drawings, wherein.

Figure 1:
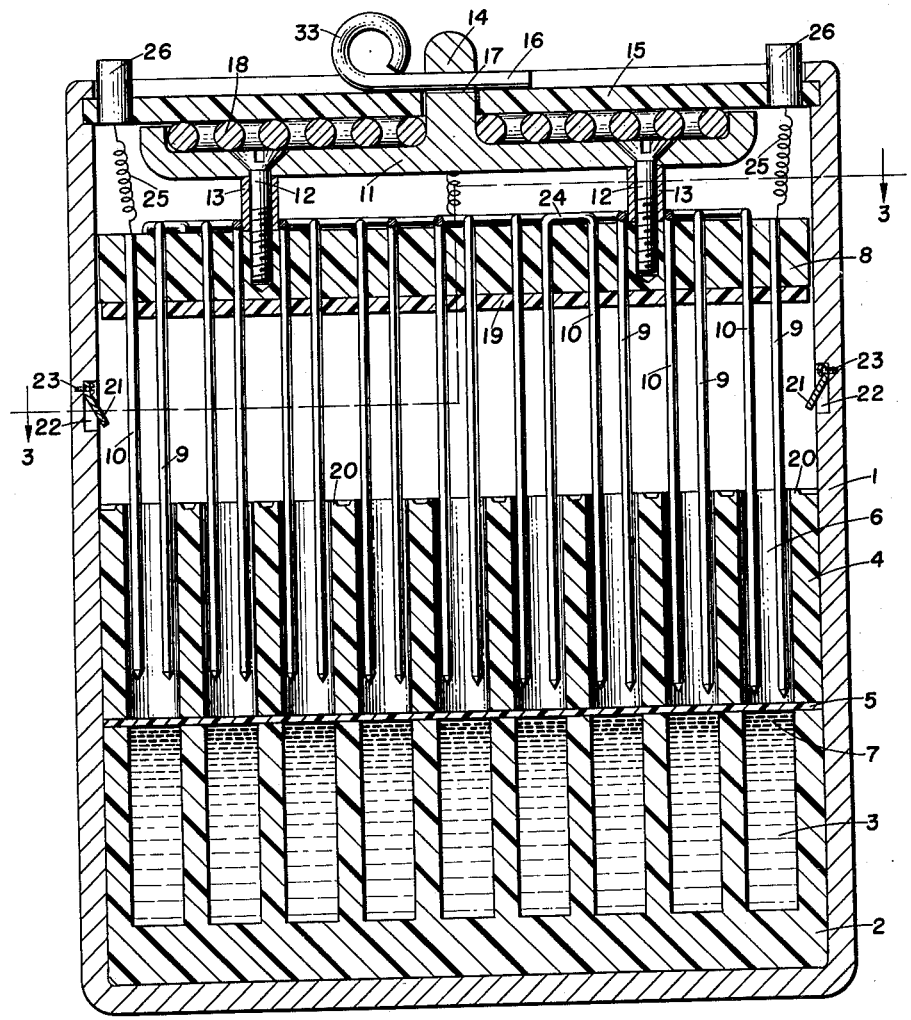
FIG. 1 is a somewhat diagrammatic elevation, in axial section, of one embodiment of the deferred action battery, the parts being shown in the positions they occupy during storage of the battery.

Referring first to the form illustrated in FIGS. 1-4 inclusive, it will be seen that the battery comprises a container 1 in which is accommodated a cell block 2, which consists of a member that fits in container 1 and has a plurality of cavities or compartments 3 therein. These compartments may be formed in the block 2 by drilling, boring, molding, or in any other suitable way. All the compartments are open at one end and closed at the other, and cannot communicate with one another, except through their open ends.

A spacer block 4 abuts against a partition or membrane 5, which separates it from the cell block 2. This spacer block 4 has bores 6 extending completely therethrough, each bore being in alinement with a corresponding cell compartment 3 in the block 2.

The compartments 3 contain the electrolyte 7, substantially filling them to the level shown. This electrolyte 7 is sealed in place by the membrane 5, so long as the latter is not punctured or otherwise broken.

Mounted beyond the spacer block 4, and close to the end of the container 1, is an electrode support, shown as a disc 8, preferably made of a plastic, mounted to slide loosely within the container 1, and carrying positive electrodes 9 and negative electrodes 10, in sufficient numbers to provide the desired voltages of the battery, when activated. The electrodes 9 and 10 may be molded into the disc 8, at the time said disc itself is molded. In the present illustration, the cells are connected to provide a 3-cell C battery, a single-cell A battery, and a 57-cell B battery, but it will be understood that these are arbitrary numbers, and in actual service the respective numbers of cells will be chosen and interconnected as required, to suit the electronic apparatus to be energized by said battery.

Of course the cell block 2, spacer block 4, membrane 5, electrode support 8 and any other non-electrode parts that will or may come into contact with the electrodes and/or electrolyte will be made of suitable material, that will not produce short-circuits and will not react with the electrolyte or be corroded thereby.

The disc 8, which supports all the electrodes 9 and 10, has a cupped or dish-shaped operating device 11 secured thereto, for example, by the screws 12 and spacing collars 13, so that the dish-shaped member 11 is firmly fastened to said disc. Member 11 has a central stem 14 thereon, so that the whole assemblage 8–14 inclusive may be secured on the tightly fitting cover 15 of container 1 by a pin 16 inserted through a hole 17 of the stem 14. The pin 16 may have an eyelet 33.

A helicoidal spring 18 is located within the cupped member 11 as shown. In the position indicated in FIG. 1, this spring 18 has been compressed into a spiral, but in FIG. 2 it has assumed its normal helicoidal shape.

It will be noted that the spring 18 is relatively heavy and powerful. When the pin 16 is withdrawn from hole 17, this spring 18 immediately expands, pushing the disc 8 away from the cover 15, and thereby causing the electrodes 9 and 10 to pierce the partition 5, aided by their sharpened ends, and plunge into the electrolyte in the cavities 3.

The disc 8 has a lining of suitable packing or sealing material 19 on its underside, and when the disc 8 has been pushed as far as it will go toward the spacer block 4, this material 19 will come into forcible contact with the adjacent surface of the said spacer block 4, and form a liquid-tight seal therewith, isolating the bores 6 from one another. The sealing action is improved by providing a raised rim 20 around the end of each bore 6, as shown in FIG. 1.

Figure 4:
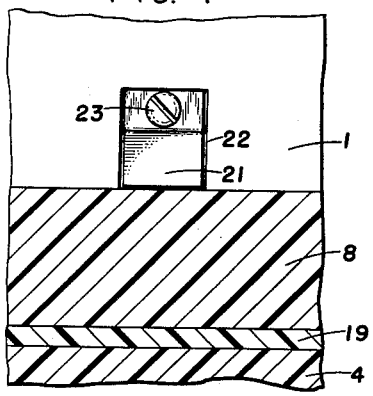
FIG. 4 is a fragmentary detail view, on a larger scale, showing a portion of the battery in section on the plane indicated by line 4—4 of FIG. 2, to disclose a spring catch or latch.

To prevent the return of the disc 8, a number of spring catches or latches 21 may be provided in corresponding niches 22 in the inner wall of the container 1. In FIG. 1, these catches are shown out of engagement with the disc 8, but in FIG. 2 they are shown holding the disc 8 against return or rebound, away from the spacer block 4, thus sealing each individual battery cell from all the others. FIG. 4 shows one of the resilient latches 21 on an enlarged scale, and indicates a screw 23 as one suitable means for securing one end of one of the laches 21 in its niche 22 in the wall of container 1.

The electrodes 9 and 10 are made of suitable materials such that a considerable electromotive force will be produced between them when inserted in the electrolyte. These electrodes 9 and 10 are connected in pairs, as shown, by the connectors 24 of FIGS. 1, 2 and 3, of various lengths and so arranged that when the electrodes 9 and 10 are in action the cell voltages will be added in series.

Flexible connectors 25 afford connections from the final electrodes to the terminals 26, so that electrical connection will be maintained regardless of the relative position of disc 8 in the container 1.

It will be seen that the electrodes 9 and 10 in FIG. 1 are shown as being progressively shorter, from right to left, as most readily evident from the gradually increasing spacing of their points from the membrane 5. Thus, it is clear that when the electrodes pierce the membrane 5, they will do so successively, thereby requiring much less force than if all of them punctured it at the same instant, which would occur if they were all alike in length. The result is that a weaker and lighter spring 18 will suffice.

Figure 5:
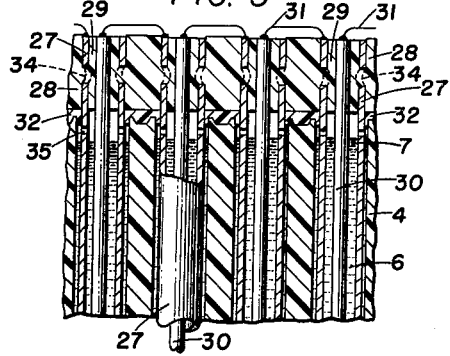
FIG. 5 is a fragmentary longitudinal section of a modified form of battery, with the electrodes in the activated position.

Referring now to FIG. 5, the modified form of battery comprises one tubular outer electrode, such as 27, and one rod electrode, such as 30, in each sell, the rod electrode 30 being within the tube, and herein for convenience called the central electrode, without thereby implying that it necessarily is concentrically located. The ends of outer electrodes 27 are mounted in holes in the disc 28, and in such ends are insulating bushings 29, which receive and hold the corresponding ends of the central electrodes 30. This result may be attained by molding the electrodes 27 and 30 directly into disc 28. Holes 34 are provided in the end portions of the electrodes 27 as shown to permit the flow of the plastic in the molding operation. Other holes 35 permit escape of air from the cells during activation. Connectors 31 provide electrical connection between the cells, each such connector 31 joining the outer electrode 27 of one cell to the central electrode 30 of another, as requisite, to secure the proper voltages.

The sealing material 32 which covers the surface of the disc 28 is similar to the material 19 of FIG. 1 in function and structure. The electrodes in FIG. 5 coact with a cell block 2 and a spacer block 4 exactly the same as those of FIGS. 1 and 2, and the remaining structural details preferably also are the same as those of FIGS. 1 and 2, the only difference in the two forms of the invention being in the shapes of the electrodes, and in corresponding minor changes necessitated thereby.

The free ends of the tubular outer electrodes 27 may be sharpened and also inclined, to facilitate cutting through the membrane 5 when the battery is in course of activation.

The operation of the invention will be obvious from the structure disclosed, but for completeness is summarized as follows:

In storage, the parts assume the positions shown in FIG. 1, wherein the pin 16 holds the spring retaining dish 11 close to the cover 15, against the push of the spring 18.

The cell compartments 3 in the cell block 2 are substantially full of a suitable electrolyte, which is sealed in place by the partition or membrane 5, against the other side of which bears the spacer block 4. The cell block 2 and the spacer block 4 may be secured in the outer container 1 in any desired way, preferably by a press fit. Inasmuch as the container 1 does not come into contact with either the electrolyte or the electrodes 9 and 10, it is preferred to make it of metal, to procide great strength without excessive weight.

Upon withdrawal of the pin 16, by any suitable force applied to the eye 33 thereof, the spring 18 will suddenly push the electrodes 9 and 10 through the partition 5 into the electrolyte 7, thus activating the battery. Compression of the air beyond the disc 8 is prevented by the loose fit of the periphery of the disc 8 in the container 1.

Due to the displacement of some of the electrolyte 7 in each cell compartment 3 by the electrodes 9 and 10, the the level of the electrolyte will rise beyond the level of membrane 5, but not sufficiently to overflow the spacer block 4. The sealing material 19 carreid by the disc 8 will be pushed tightly against the free surface of the block 4, sealing the open ends of the cells.

Figure 2:
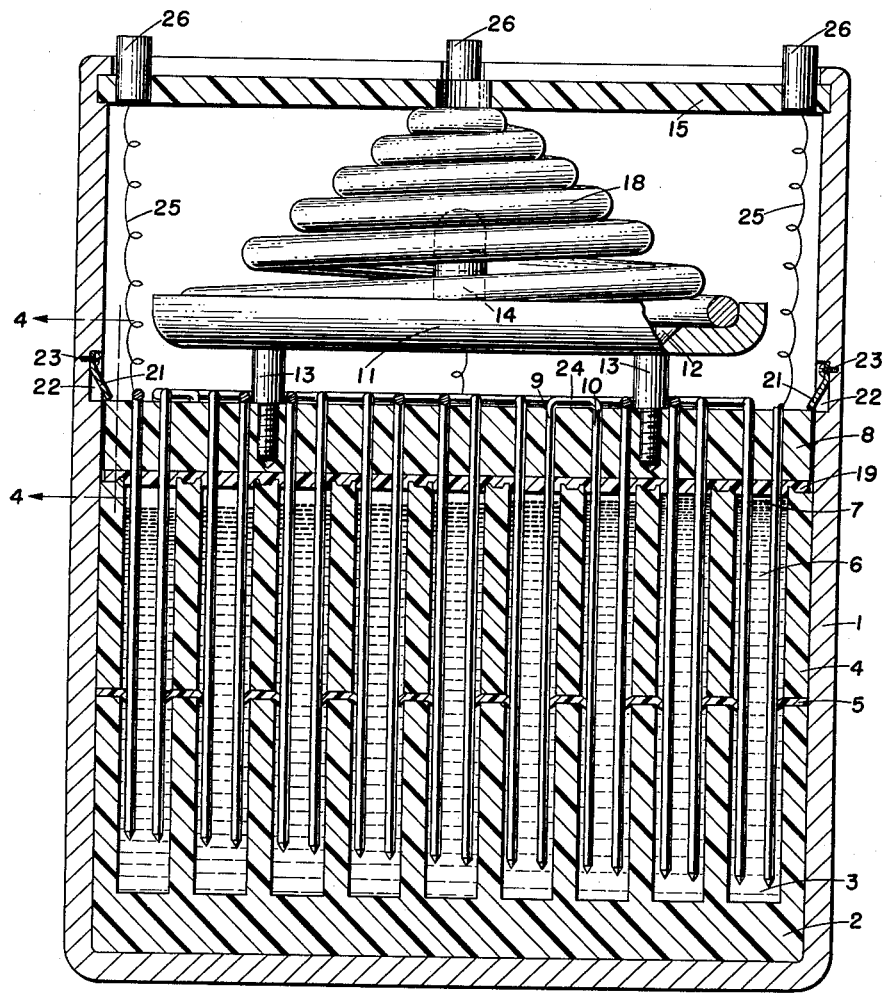
FIG. 2 is a corresponding view, but showing certain elements in front elevation, the parts being shown in the positions they assume when the battery has been activated.
Figure 3:
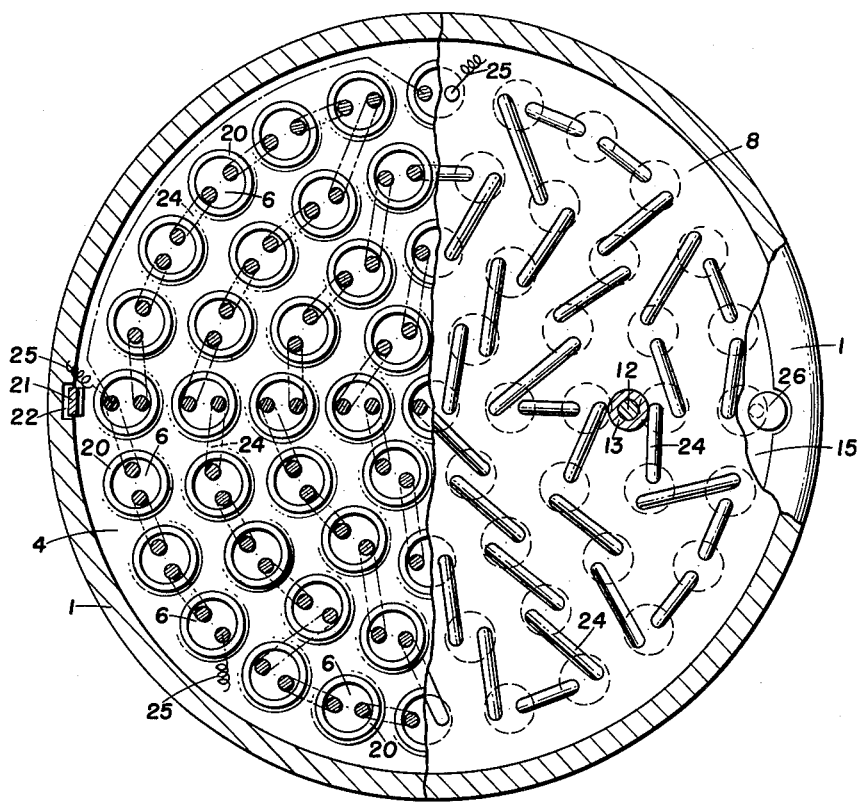
FIG. 3 is a cross-section of the battery, on the planes indicated by line 3—3 of FIG. 1.

When the disc 8 has been shifted fully, its outer edge will be caught under the ends of the spring latches 21, as shown in FIG. 2, thus preventing any return of the disc 8 upon occurrence of mechanical shocks or vibration, and keeping the cell compartments tightly sealed.

The withdrawal of the pin 16 may be accomplished by any desired agency, for example, by mechanism actuated by inertial or centrifugal forces, if such forces are available, but equally well by timing mechanism or other mechanical means when the fuze containing the battery is applied to a missile devoid of such forces, thus making this battery suitable for any type of missile, regardless of the presence or absence of spin and/or setback.

As already stated, the variation in length of an electrodes facilitates the piercing of the membrane 5, in the FIG. 1 form and a similar effect is secured in the modified form of FIG. 5 by the sharpened and inclined free ends of the tubes 27.

The liquid-tight seals between the cell block 2 and the spacer block 4 and between said spacer block and the disc 8, due to the packing material 19, will prevent any leakage of electrolyte and will also seal each individual cell from all the others. This prevents also any leakage of electricity from cell to cell along surfaces moistened with electrolyte, which otherwise might create the serious disturbances known as "electrical noise."

While a spring 18 has been illustrated and described as the source of energy for shifting the disc 8 and the electrodes mounted thereon, other ways of doing this are also possible, for example, the detonation of an ampule of an explosive gas mixture between the cover 15 and the disc 8.

It may be remarked that, of course, any of a wide variety of electrodes and electrolytes may be used, for instance, zinc and copper are possible electrodes, and a solution of an acid, such as hydrochloric, sulfuric or phosphoric acid, in water, with a suitable depolarizing agent, may serve as the electrolyte. It would also be possible to divide the cell block by an additional partition, thus forming two separate parts of each cell compartment 3, one containing water, the other concentrated acid, whereby at the time of mixing, upon puncture of both partitions, heat will be generated in the electrolyte by the intermixing, thereby increasing the battery voltage in cold climates, and avoiding sluggishness of said battery.

Obviously many modifications and variations of the present invention are possible in the light of the above teachings. It is therefore to be understood that within the scope of the appended claims the invention may be practiced otherwise than as specifically described.

I claim:

1. In a deferred action battery having a plurality of cells containing an electrolyte, a membrane closing said cells, and wherein the electrodes must pierce said membrane in the course of activation of the battery, said electrodes being of various lengths, whereby said electrodes will pierce the membrane successively instead of simultaneously, thereby decreasing the force requisite.

2. In a deferred action battery, in combination, a member having a cell compartment therein, an electrolyte in said compartment, a membrane closing said compartment, a set of battery electrodes arranged to pierce said membrane and thus enter said electrolyte, and a stressed resilient element for forcing said electrodes through said membrane.

3. In a deferred action battery, in combination, a member having a cell compartment therein, an electrolyte in said compartment, a membrane closing said compartment, a set of battery electrodes arranged to pierce said membrane and thus enter said electrolyte, a stressed resilient element for forcing said electrodes through said membrane, and means for sealing said compartment after said membrane has been pierced.

4. A deferred action battery, comprising, a container, a cell block in said container having a plurality of compartments, each compartment containing an electrolyte, a membrane covering said cell block and sealing said compartments, a spacer block bearing against the other side of said membrane, said spacer block having bores alined with said compartment, a pair of electrodes in each bore, means for forcing said electrodes through said membrane and into said electrolyte, and a second membrane for sealing the ends of the bores remote from said cell block.

5. A deferred action battery, comprising, a container, a cell block within said container having a plurality of compartments, each compartment containing an electrolyte, a membrane covering said cell block and sealing said compartments, a spacer block bearing against the other side of said membrane, said spacer block having bores alined with said compartments, a pair of electrodes in each bore, said electrodes being carried by a support movable in said container, means for moving said support and for forcing said electrodes through said membrane and into said electrolyte, and latching means to retain said support in its position of nearest approach to said spacer block.

6. A deferred action battery, comprising, a container, a cell block in said container and having a plurality of compartments, each compartment containing an electrolyte, a membrane covering said cell block and sealing said compartments, a disc movable in said container, electrodes carried by said disc and movable into said compartments, a stressed resilient element urging said disc toward said cell block for forcing said electrodes through said membrane and into said electrolyte, removable means for retaining said disc at the end of said container remote from the cell block against the force of said stressed resilient element, whereby said disc and said electrodes carried by said disc will move toward said cell block when said removable means releases said disc, and said electrodes will subsequently pierce said membrane and enter into said electrolyte.

References Cited in the file of this patent

UNITED STATES PATENTS

| 253,165 | Holt | Jan. 31, 1882 |
| 366,034 | Seiler | July 5, 1887 |
| 1,218,847 | Firey | Mar. 13, 1917 |

FOREIGN PATENTS

| 404,421 | Germany | Oct. 17, 1924 |